June 16, 1942.    A. BENZICK ET AL    2,286,784
SEAT CONSTRUCTION
Filed Dec. 6, 1939    2 Sheets-Sheet 2
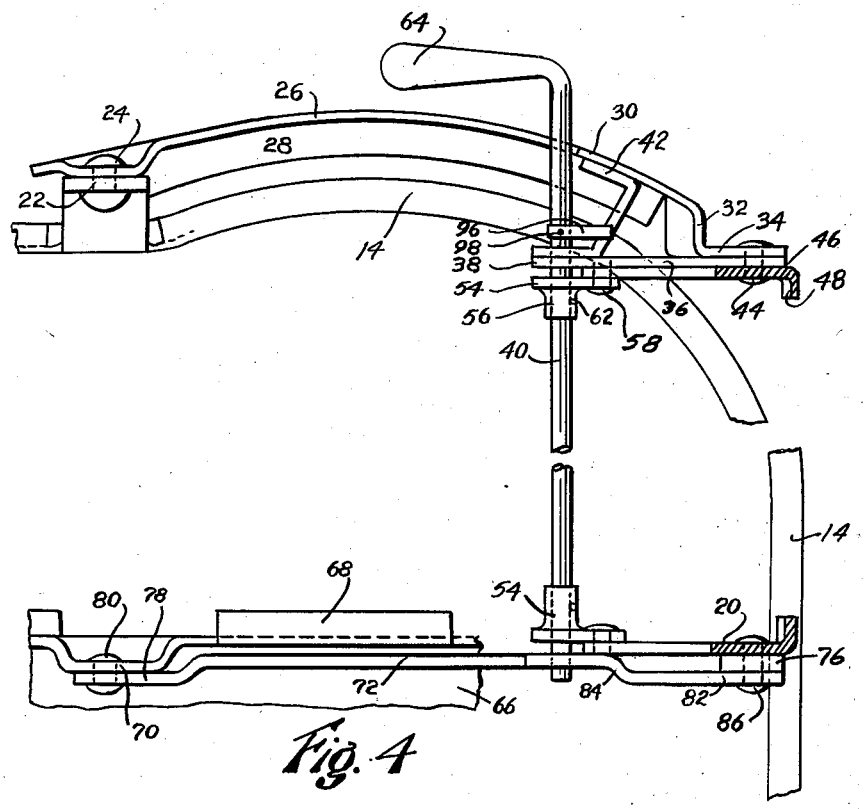
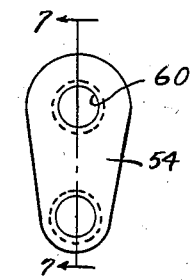
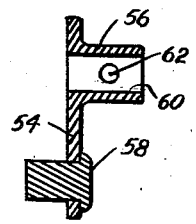
INVENTORS
ALEXANDER BENZICK
HERMAN C. RUSCH
BY Carl J. Barbee
ATTORNEY.

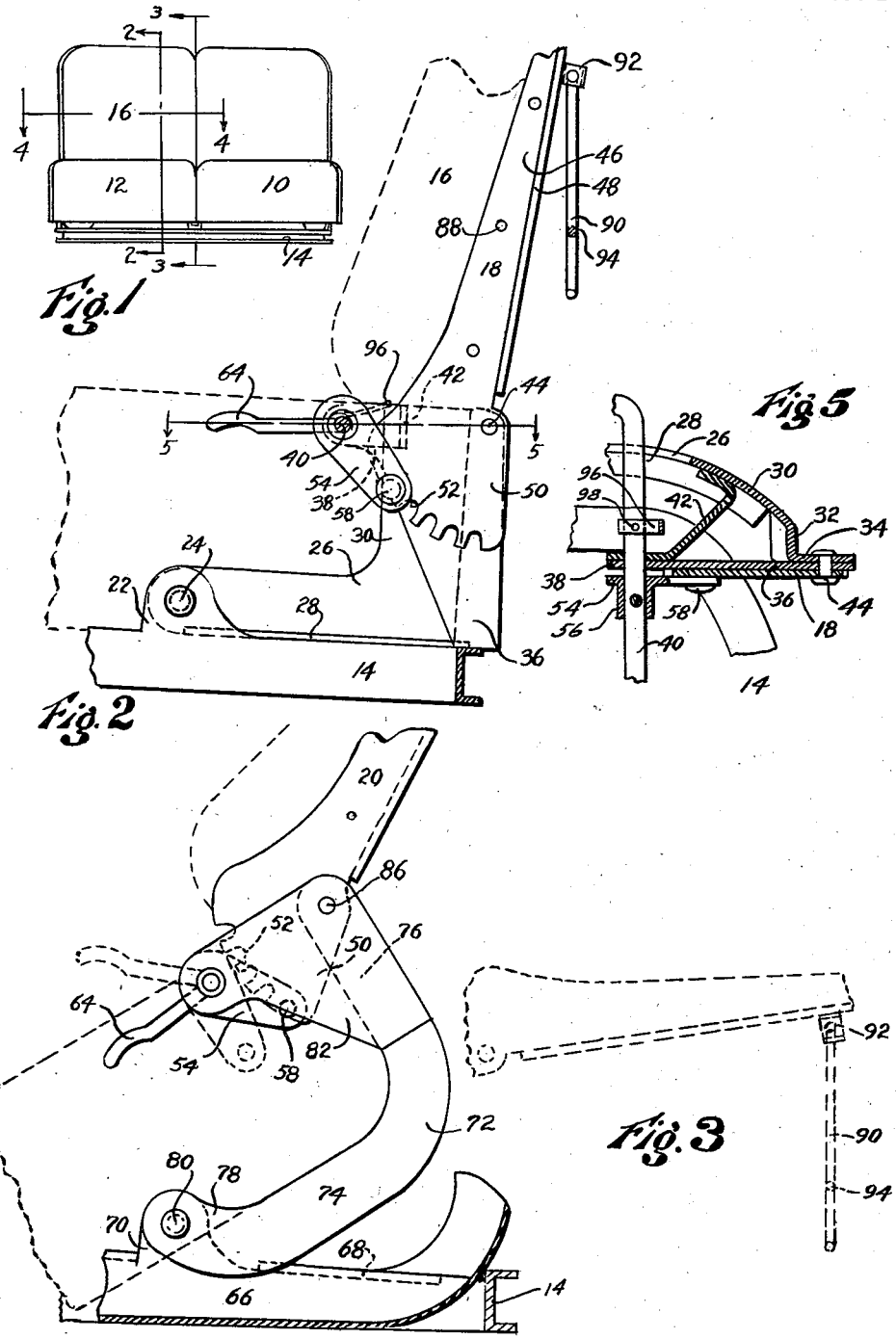

Patented June 16, 1942

2,286,784

UNITED STATES PATENT OFFICE 2,286,784

SEAT CONSTRUCTION

Alexander Benzick and Herman C. Rusch, Milwaukee, Wis., assignors to Nash-Kelvinator Corporation, Kenosha, Wis., a corporation of Maryland Application December 6, 1939, Serial No. 307,737

7 Claims. (Cl. 155—7)

This invention relates to seat construction and has particular reference to the framing of a seat for an automobile.

It is an object of this invention to provide an adjustable back for an automobile seat.

It is another object of this invention to provide an automobile seat which is arranged to tilt forward and also fold back to form a lounge chair or bed.

It is another object of this invention to provide a seat for an automobile which is adjustable to various positions to suit the comfort of the user.

It is another object of this invention to provide a novel hinge structure for the back of a seat which will allow the back to be fixed in any one of a plurality of positions.

It is another object of this invention to provide a novel hinge arranged to tip a seat forward which hinge is also adapted to carry a second hinge for folding a seat backwardly.

Other objects and advantages of this invention will be apparent from a consideration of the attached drawings of which there are two sheets and in which—

Figure 1 represents a front elevation of a seat for an automobile;

Figure 2 represents a section taken along the line 2—2 of Figure 1 and looking in the direction of the arrows;

Figure 3 represents a section taken along the line 3—3 of Figure 1 showing the parts in tilted position and looking in the direction of the arrows;

Figure 4 represents a section taken along the line 4—4 of Figure 1 and looking in the direction of the arrows;

Figure 5 represents a section taken along the line 5—5 of Figure 2 and looking in the direction of the arrows;

Figure 6 represents an elevation of the locking pin assembly used in our invention; and, Figure 7 represents a section taken along the line 7—7 of Figure 6.

We have illustrated in Figure 1 the front seat of an automobile. This seat is divided in two sections, into a driver's seat 10 and the right hand or passenger seat 12. The seat is supported upon a suitable frame 14 which we have shown to be a channel member arranged to conform generally to the outline of the seat structure. The member 14 may be fastened directly to the floor of the automobile or may form a part of a movable carriage sliding the entire seat structure forward or backward as is commonly done in automobiles today.

This invention deals particularly with the right hand seat 12 which is provided with a back cushion 16. Back cushion 16 is supported by means of a right upper hinge leaf 18 and a center or left upper hinge leaf 20. On the right or outside of the frame member 14 we have provided a lug 22. This lug may be in any form so long as it is attached rigidly to the frame member 14. We have shown it to be constructed by bending up a portion of the flange of the member 14. Pivoted to the lug 22 by means of the bolt or rivet 24 is the lower hinge leaf 26. The hinge 26 is made up of an angle shaped member having a lower inturned flange 28 for stiffening purposes and is curved outwardly from the lug 22 to conform generally with the outline of the seat cushion. Near the back of the lower hinge leaf 26 is provided a raised portion 30 which is bent in at 32 near the back of the hinge and then continued to the rear in a vertical flange 34. On the inside of the flange is welded a plate 36 which has a forwardly projecting portion 38 for supporting a shaft 40. The shaft supporting portion 38 of the plate 36 is braced relative to the lower hinge leaf 26 by means of the U-shaped bracket 42 which is welded to the upstanding portion 30 of the hinge leaf 26 and to the shaft supporting section of the plate 36. It will be noted that the shaft supporting section 38 of the plate 36 extends forwardly of the upstanding portion 30 of the lower hinge leaf 26. In this manner the shaft 40 may be extended beyond the side of the lower hinge leaf 26 without interfering with the upstanding portion 30.

The right hand upper hinge leaf is fastened to the lower hinge leaf by means of a pivot 44 which is passed through the upper hinge leaf 18 and the rear flange 34 of the lower hinge leaf 26 and the plate 36 which is welded to the flange 34. The upper hinge leaf 18 is made of flat metal stock and has a flange 46 (see Figure 4), an inturned flange 48 for supporting the back cushion and a lower segment shaped portion 50, along the bottom edge of which is formed a series of notches 52. The segment portion 50 of the upper hinge leaf is supported sideways against the plate 36 and may be swung about the pivot 44 in a vertical plane.

In order to maintain the upper hinge leaf 18 in a given angular position relative to the lower hinge, we have provided the locking lever 54 which is a flat piece of metal having a boss portion 56 and carrying the lug 58 which may be press fitted or welded into a hole in the lever 54. Boss 56 is drilled at 60 to receive the shaft 40 and is provided with a hole 62 through which a pin may be passed to fix the locking lever 54 to the shaft 40. The locking lever 54 is fastened to the shaft 40, as just described, at a point where the lug 58 will engage the notches 52 in the upper hinge leaf segment. It will be noted that we have arranged the position of the shaft 40 to be as nearly as possible on the circle generated by the notches 52 as they rotate about the pivot 44. In this manner any tendency of a rotative force in the upper hinge to act on the lug 58 and rotate the locking lever 54 is reduced to a minimum since any force so applied will act almost directly through the axis of shaft 40. The shaft 40 extends to the right of the seat and is provided with a handle portion 64 so that the shaft may be rotated by the occupant to engage or disengage the lug 58 with the upper hinge leaf 18.

The left side of the right seat is similar to the right side in operation. At the center or left side of the seat we have provided a longitudinally extending channel member 66 having a horizontal stiffening flange 68 and an upstanding ear or lug 70 to which is fastened the center lower hinge leaf 72. The channel member 66 is rigidly fastened to the base member 14 and may be made as a part thereof. The center lower hinge leaf 72 is formed of flat bar stock and has a bottom or horizontal portion 74 and a vertical arm 76. The lower horizontal portion 74 is bent up slightly and offset towards the center of the car at 78 so that when the hinge 72 is fastened to the channel member 66 by means of the pivot 80, the horizontal portion 74 will rest on the bottom of the channel member 66.

Welded to the top portion 76 of the lower hinge leaf 72 is a generally triangularly shaped plate 82 which extends forwardly of the portion 76 and is bent back into the plane of the lower hinge 72 at 84. The forward portion of the plate 82 is drilled to receive the end of the shaft 40 which carries a second locking lever 54 to engage the center upper hinge leaf 20. The upper center hinge leaf 20 is just the reverse of the hinge leaf 18 and has the same notches 52 which cooperate with the locking pin 58 in the same manner as described in connection with the outer hinge leaf 18. The upper center hinge leaf 20 is fastened to the center lower hinge leaf 72 by means of the pivot 86 which is passed through the upper end of the lower hinge leaf 76, the plate 82, and the upper hinge leaf 20.

The actual cushioning and springs for the seat and back portion may be made up separately according to the general practice today and fastened to the hinge members by any suitable means such as bolting the back cushion to the upper hinges 18 and 20 through the holes 88 and by resting the bottom or seat cushion upon the channel member 14 and the lower hinges 26 and 72. It should thus be apparent that when the handle 64 is pressed down, locking the back portion 16 with respect to the lower hinge, the entire seat may be tipped forward about the pivots 24 and 80. This construction is necessary in the present day two door automobile construction where it is necessary to make room for persons to enter the back seat through the single front door. By pulling the handle 64 upwardly the locking pin 54 will become disengaged from the notches 52, and the back portion 16 may be lowered to any position desired by the occupant. If desired, the back may be lowered to the horizontal position in which case it will form, in connection with the seat portion 12 and back seat of the automobile, a bed for emergency or overnight use. A car provided with this type of seat may be used advantageously on camping trips and as a convertible ambulance; it is especially suited to long trips where one passenger sleeps while the other drives. When the back portion 16 is lowered to the horizontal position, its top or back portion will be supported by means of the legs 90 which are rods pivoted in the brackets 92 screwed to the back of the seat. The rods 90 may be bent up from their lower portion and connected by a cross bar 94 to form a robe rail across the back of the seat.

The shaft 40 is provided with a leaf spring 96 which is fixed to the shaft by the pin 98. The spring bears on the brace 42 and tends to rotate the shaft so as to keep the locking pin 58 in engagement with the notches 52.

While we have described our invention in some detail, we do not intend this description to be limiting upon our invention, and we reserve the right to such equivalent structures as shown within the following claims.

We claim:

1. In an automotive seat construction, a base member, means forming two supporting points on said base member, two lower hinge members pivoted on said supporting points and arranged to rest on said base to the rear of said supporting points, plates carried by said hinge members in opposite parallel relationship, an upper hinge member pivoted to each of said plate members, said upper hinge members having a surface below their pivot points in contact with said plates and defining a series of radially disposed notches, locking pins pivoted to said lower hinges and having lugs engageable with said notches in said upper hinge, the points at which said locking pins are pivoted to said lower hinge being just outside the arc generated by said notches about their pivots, and means for moving said locking pins into and out of engagement with said notches.

2. In an automobile seat, a base member, means forming a supporting point fastened to said base member, a lower hinge pivoted to said supporting point and arranged to rest on said base to the rear of said supporting point, an upper hinge pivoted to said lower hinge at the rear thereof, said upper hinge having a segmental portion defining a series of notches below the point where said upper hinge is pivoted to said lower hinge, a locking pin pivoted to said lower hinge and having a lug engageable with said notches in said upper hinge, the point at which said locking pin is pivoted to said lower hinge being just outside the arc generated by said notches about their pivot, and means for moving said locking pin into and out of engagement with said notches.

3. Automotive seat construction comprising a lower hinge member, said hinge member being pivoted at its forward end and curved to fit the end of a seat cushion, an upstanding portion on the rear of said lower hinge member, a vertical longitudinal flange formed on said upstanding portion, a forwardly extending plate fastened to said flange, a rotatable shaft carried by said plate, an upper hinge member pivoted to said lower hinge member, and a locking pin carried on said shaft engageable with said upper hinge member when said upper hinge member is moved into any of a plurality of positions.

4. Automotive seat construction comprising a lower hinge member, said hinge member being pivoted at its forward end and curved to fit the end of a seat cushion, an upstanding portion on the rear of said lower hinge member, a vertical longitudinal flange formed on said upstanding portion, a forwardly extending plate fastened to said flange, a rotatable shaft carried at the forward portion of said plate, an upper hinge member pivoted to said plate, and a locking pin carried on said shaft engageable with said upper hinge member to lock the same in any of a plurality of positions.

5. A lower hinge for a folding seat comprising an angle curved to fit the outline on the end of said seat, a raised portion on the back of said angle, said raised portion being bent to the rear to form a vertical flange, a plate secured to said vertical flange and extending forwardly therefrom, and a reinforcing bracket secured to the forward portion of said plate and to the raised portion of said channel.

6. Automotive seat construction comprising a lower hinge member, said hinge member being pivoted at its forward end and curved to fit the ends of a seat cushion, an upstanding portion on the rear of said lower hinge member, a vertical longitudinal flange formed on said upstanding portion, a plate secured to said vertical flange, a reinforcing bracket secured between said plate and the upstanding portion of said lower hinge member, an upper hinge member, a pivot passed through said plate and vertical flange for supporting said upper hinge member, a shaft journaled in said plate and said reinforcing bracket, and a locking lever mounted on said shaft and arranged to engage said upper hinge.

7. Automotive seat construction comprising a lower hinge member, said hinge member being pivoted at its forward end and curved to fit the end of a seat cushion, an upstanding portion on the rear of said lower hinge member, a generally vertical longitudinal flange formed on said upstanding portion, a plate fastened to said flange and extending beyond an edge of said flange, a rotatable shaft carried by said plate, an upper hinge member pivoted to said lower hinge member, and a locking pin carried on said shaft engageable with said upper hinge member in any of a plurality of positions.

ALEXANDER BENZICK.
HERMAN C. RUSCH.